United States Patent
Haines

(10) Patent No.: US 7,383,860 B2
(45) Date of Patent: Jun. 10, 2008

(54) FLOW CONTROL VALVE WITH TWO STAGE PINTEL AND CONCENTRIC VALVE SEATS

(75) Inventor: Joshua M. Haines, Vassar, MI (US)

(73) Assignee: Delphi Technologies, Inc., Troy, MI (US)

( * ) Notice: Subject to any disclaimer, the term of this patent is extended or adjusted under 35 U.S.C. 154(b) by 219 days.

(21) Appl. No.: 11/056,314

(22) Filed: Feb. 11, 2005

(65) Prior Publication Data

US 2006/0180211 A1    Aug. 17, 2006

(51) Int. Cl.
*F16K 1/52*    (2006.01)
(52) U.S. Cl. .................. 137/630.22; 137/599.16; 137/601.01
(58) Field of Classification Search ................ 137/629, 137/630.19, 630.22, 628, 601.01, 599.16, 137/625.33, 625.37, 625.36
See application file for complete search history.

(56) References Cited

U.S. PATENT DOCUMENTS

| | | | | |
|---|---|---|---|---|
| 397,672 A | * | 2/1889 | Tonge | 137/601.01 |
| 702,383 A | * | 6/1902 | Tyson | 137/630.22 |
| 3,194,268 A | * | 7/1965 | Vicenzi et al. | 137/630.19 |
| 3,342,203 A | * | 9/1967 | Abercrombie | 137/629 |
| 3,344,807 A | * | 10/1967 | Lehrer et al. | 137/630.19 |
| 3,642,029 A | * | 2/1972 | Katchka | 137/629 |
| 4,023,355 A | * | 5/1977 | McDonald | 60/254 |
| 4,337,742 A | | 7/1982 | Carlson et al. | |
| 5,390,703 A | * | 2/1995 | Tengesdal | 137/629 |
| 5,626,030 A | * | 5/1997 | Nagai | 137/599.11 |
| 2002/0017322 A1 | | 2/2002 | Gagnon | |

* cited by examiner

*Primary Examiner*—Stephen M Hepperle
(74) *Attorney, Agent, or Firm*—Paul L. Marshall

(57) ABSTRACT

A high resolution flow valve may comprise a first stage valve for allowing a first flow through the flow valve and a second stage valve located concentrically within the first stage valve and also connected to the inlet for allowing an additional second flow through the flow valve.

15 Claims, 6 Drawing Sheets

FLOW CONTROL VALVE WITH TWO STAGE PINTEL AND CONCENTRIC VALVE SEATS

BACKGROUND

The advent of fuel cells as alternative propulsion systems or auxiliary power units (APU's) for automotive and other applications, and the advent of advanced engines having capability for lower emissions and better fuel efficiency, have created a need for improved and highly specialized gas flow control valves. This includes diesel fuel reformate valves which may be used with APU fuel cells for example, or to provide $NO_x$ reductants for emissions control in advanced diesel engines, or for other uses. A reformer or fuel processor, can convert a hydrocarbon fuel (e.g., methane, propane, natural gas, gasoline, diesel, oxygenated hydrocarbons, and the like) to hydrogen or to a less complex hydrocarbon. More particularly, fuel reforming can comprise mixing a hydrocarbon fuel with air, water, and/or steam in a mixing zone of the reformer prior to entering a reforming zone of the reformer, and converting the hydrocarbon fuel into, for example, hydrogen ($H_2$), byproducts, e.g., carbon monoxide (CO), methane ($CH_4$), inert materials e.g., nitrogen ($N_2$), carbon dioxide ($CO_2$), and water ($H_2O$). Also, fuel cells for example are known to use hydrogen gas as an energetic fuel for exothermic combination with oxygen at high temperature. Hydrogen may be supplied continuously to a fuel cell as a "reformate" product. Additionally, regarding emissions technology, Hydrogen reformate may need to be directed to a Diesel Particulate Filter (DPF), NOx trap, or other device.

U.S. Pat. No. 4,337,742 shows an idle air control valve that is similar to the idle air control valve found in many modern engines. However, this single valve design has several disadvantages, some of which become acutely apparent when the valve is sized to meet the airflow requirements of a fuel reformer application or an application requiring higher flow than that dictated for an internal combustion engine. For example, if a single valve of this valve design was used for a reformer application or for a high flow application, it would have poor resolution when low airflow is required.

U.S. Patent application to Gagnon, US 2002/0017322, discloses an air control valve for fuel cells. The device has a single air inlet that enters a manifold. The manifold houses two valves, and each valve has its own respective outlet. Since each valve has its own outlet and its own airflow or airmass meter, the resultant airflow total resolution is not controlled as a whole. Rather, separate and distinct sections of the device are controlled to control the total airflow.

Thus, what is needed in the art is a valve that can control the flow of gases or liquids with a high degree of resolution without necessitating use of multiple apertures and multiple actuator motors. In a present embodiment, increased flow and resolution capability is provided by adding a second valve and a second stage. Additionally, only one motor is necessary to actuate the actuator.

SUMMARY OF THE INVENTION

An embodiment may comprise a first stage valve seat located on a flow aperture; a first stage pintel sized to interface with the first stage valve seat; a second stage pintel located concentrically with the first stage pintel wherein the second stage pintel has a smaller diameter than the first stage pintel; and a mount located radially inward from the first valve seat within the aperture.

In another embodiment a flow valve may comprise a housing; a single inlet located in the housing; a first chamber located within the housing and connected to the inlet; a second chamber located within the housing; an aperture located in the housing that connects the first chamber to the second chamber; a first stage valve seat located in the housing about the aperture; a first stage pintel sized to interface with the first stage valve seat; a second stage pintel located concentrically with the first stage pintel wherein the second stage pintel has a smaller diameter than the first stage pintel; a mount located radially inward from the first valve seat within the aperture; an actuator for actuating the first stage pintel and the second stage pintel with regard to the first stage valve seat and the mount respectively; wherein a first passage is formed in the aperture between the mount and the housing and wherein a second passage is formed within the mount; and a single outlet located in the housing and connected to the second chamber.

Another embodiment may comprise a high resolution flow valve comprising a single inlet; a first stage valve connected to the inlet for allowing a first flow through the airflow valve; a second stage valve located concentrically within the first stage valve and also connected to the inlet for allowing an additional second flow through the flow valve; and a single outlet connected to the first and second stage valve.

Another embodiment may comprise a method for controlling flow through a valve with high resolution comprise sending flow through a first stage valve seat located on a flow aperture; regulating the flow by controlling a first stage pintel sized to interface with the first stage valve seat; and further regulating the flow by controlling a second stage pintel located concentrically with the first stage pintel wherein the second stage pintel has a smaller diameter than the first stage pintel whereby the flow may also be sent through a mount located radially inward from the first valve seat within the aperture.

Another embodiment may also comprise a method for controlling flow through a valve with high resolution comprising sending flow through a single inlet located in a housing; sending the flow next through a first chamber located within the housing; sending the flow to an aperture located in the housing that connects the first chamber to a second chamber; adjusting the flow at the aperture in two stages via an actuatable valve member structured to adjustably increase, decrease, or prevent flow through the aperture by actuating a two stage pintel arrangement wherein a first pintel is adjusted allowing flow through a first passage as a first stage and wherein a second pintel located concentrically with the first pintel and having a smaller diameter than the first pintel is adjusted allowing flow through a second passage as a second stage; and sending the flow next through a single outlet located in the housing and connected to the second chamber.

BRIEF DESCRIPTION OF FIGURES

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Figure 1:
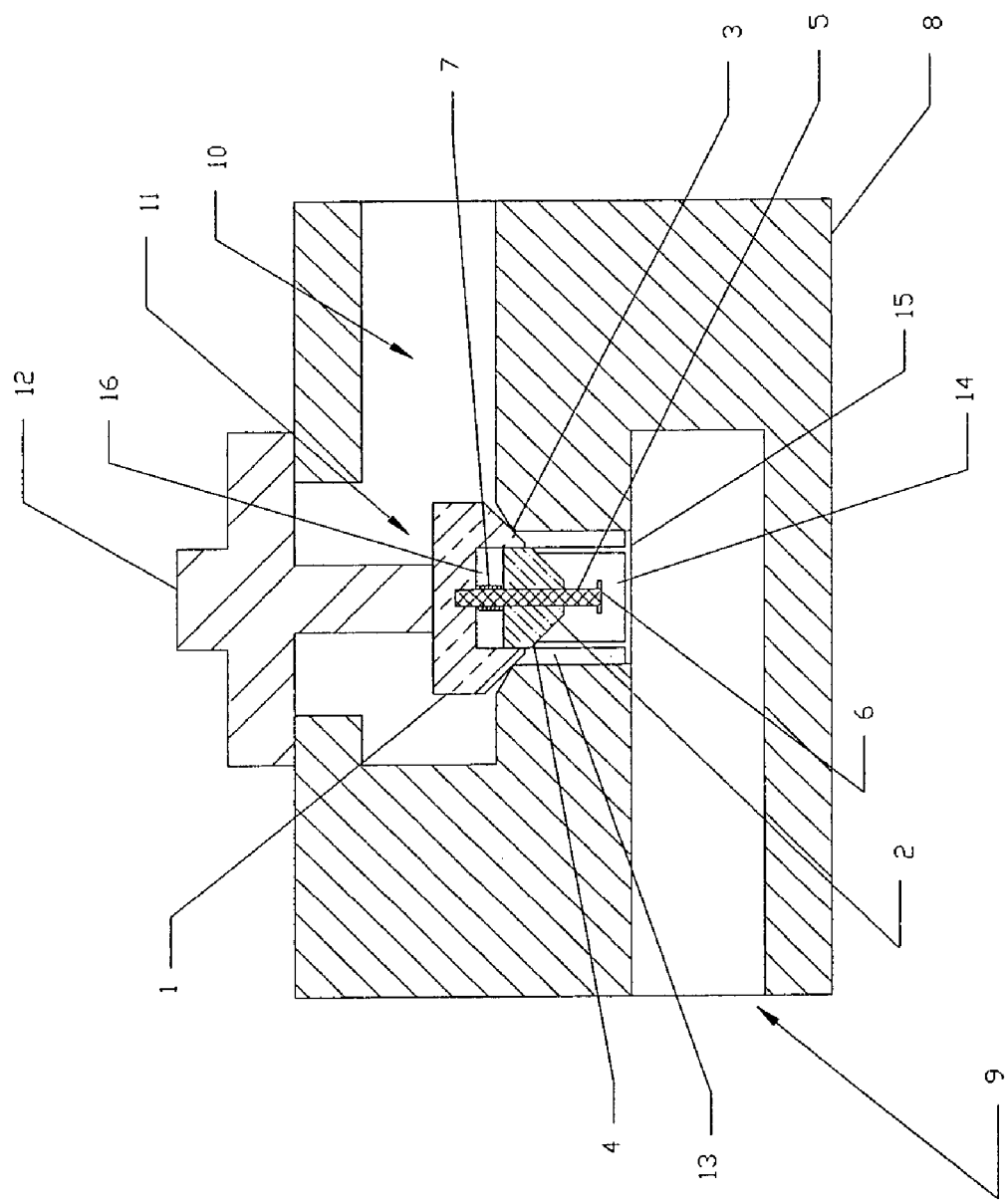
FIG. 1 is a cut away side view of an embodiment of a valve in a closed position.
Figure 2:
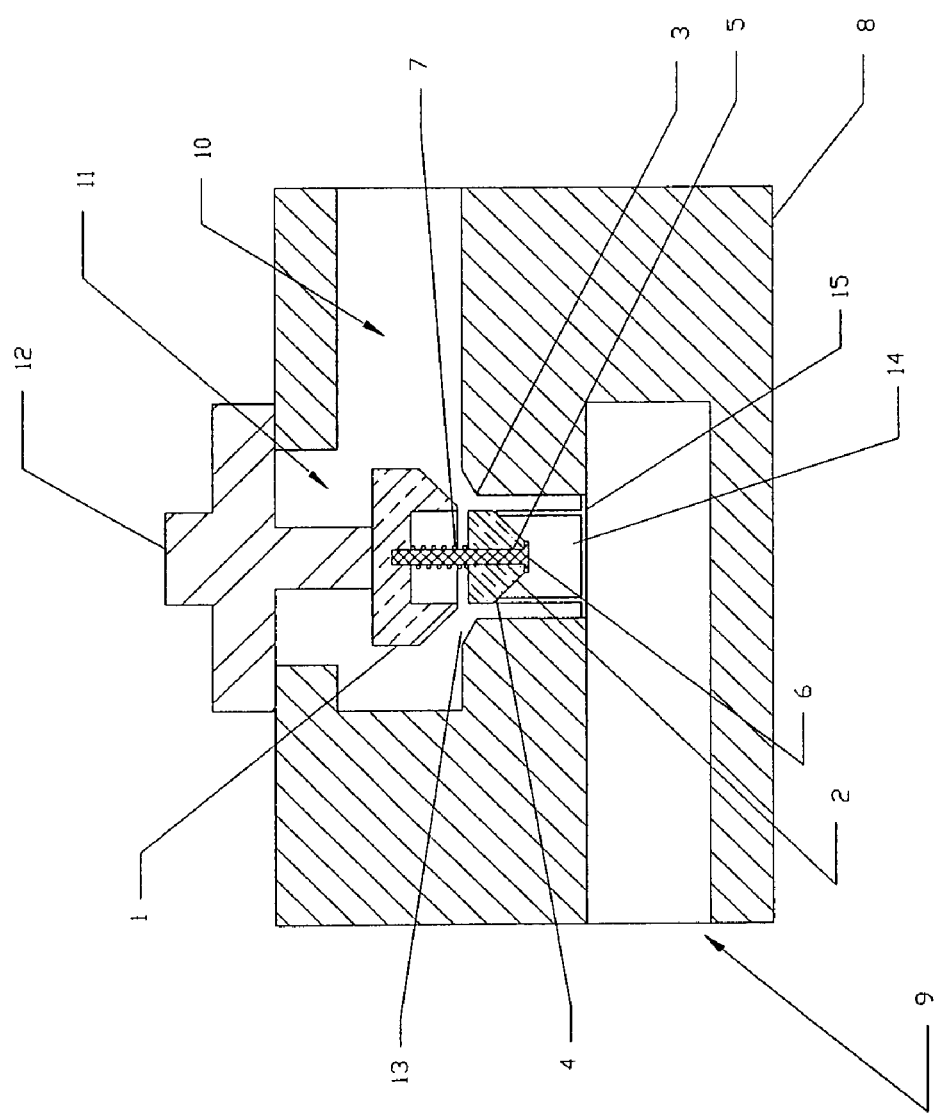
FIG. 2 is a cut away side view of an embodiment of a valve having a first stage pintel open and a second stage pintel closed.
Figure 3:
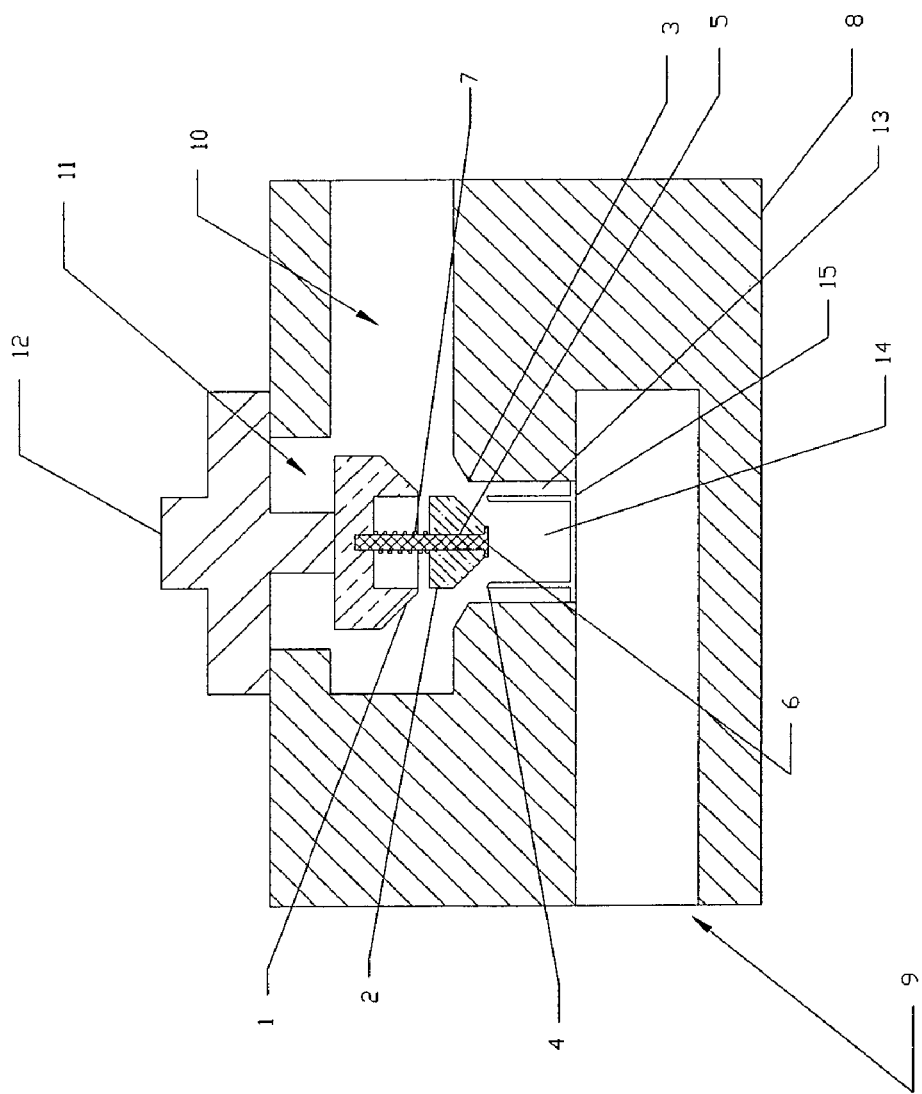
FIG. 3 is a cut away side view of an embodiment of a valve having a first and second stage pintel open.

Referring to FIGS. 1-3, the operation of the valve from fully closed to fully open positions is shown. The valve may be used for controlling the flow of gases or liquids. Air is used as an example herein but the valve is not limited to controlling airflow per se. A housing 8 includes an air inlet passage 9 and an air outlet passage 10. The housing may be made in one piece or may be an assembly of two or more pieces. Furthermore, the housing 8 may be made of various materials which may include, but are not limited to, many species of metal or plastic. The material is chosen based on several factors, such as the conditions the valve will be exposed to and durability requirements the valve will be expected to meet. The air inlet passage 9 and the air outlet passage 10 may also be described as air chambers. Disposed between the air inlet passage 9 and the air outlet passage 10 is a valve member 11 for regulating the flow of air through the housing 8 via the first air passage 13 and/or through the second air passage 14. The valve member 11 comprises a first stage pintel 1, a second stage pintel 2 moveable within a cavity 16 in the first stage pintel 1. The second stage pintel 2 moves along the second stage pintel guide 5. The second stage pintel 2 moves along the second stage pintel guide 5 due to the force of the spring 7 which resiliently biases the second stage pintel 2 against the second stage valve seat 4 until the actuator 12 is withdrawn to a point where the second stage pintel 2 contacts the second stage pintel stop 6 and is subsequently lifted away from the second stage valve seat 4 by the actuator 12.

Thus, as shown by comparing FIGS. 1-3 the valve operates in three main open or closed states which are also adjustable. Specifically, as a controller or airflow meter (not shown) determines that airflow is needed in order to satisfy the demands of the device using the air, the controller sends a signal to the actuator 12. In response, the actuator 12 retracts the first stage pintel 1 from the first stage valve seat 3. As the first stage pintel 1 is retracted from the first stage valve seat 3, the spring 7 keeps the second stage pintel 2 in contact with the second stage valve seat 4. With the second stage pintel 2 still in contact with the second stage valve seat 4, air is allowed to only flow through the first air passage 13 at this point. If the controller determines that additional airflow is required in order to satisfy the demands of the device using the air, the controller will continue to signal the actuator 12 to retract the first stage pintel 1 further from the first stage valve seat 3. As the first stage pintel 1 is retracted further from the first stage valve seat 3, more air is allowed to flow through the first air passage 13 due to the change in geometry between the first stage pintel 1 and the first stage valve seat 3. When the controller determines that the airflow requirements of the device using the air cannot be satisfied only by retracting the first stage pintel 1 from the first stage valve seat 3, the controller will signal the actuator 12 to retract the first stage pintel 1 until the second stage pintel 2 contacts the second stage pintel stop 6. As the actuator 12 continues to retract, the second stage pintel 2 will be lifted from the second stage valve seat 4 and additional air will flow through the second air passage 14. The second air passage 14 is arranged concentrically and radially inward from the first air passage 13 and is comprised of a mount 15 on which the second stage valve seat 4 is located.

When the controller determines that the airflow requirements of the device using the air have been reduced, the process is reversed. First, the controller will signal the actuator 12 to move the second stage pintel 2 toward the second stage valve seat 4. While the second stage pintel 2 moves toward the second stage valve seat 4, the flow of air through the second air passage 14 will be reduced, and then finally eliminated when the second stage pintel 2 comes into contact with the second stage valve seat 4. If the controller determines that further reduction of the airflow is need in order to match the requirements of the device using the air, the actuator 12 will be signaled to move the first stage pintel 1 toward the first stage valve seat 3. While the first stage pintel 1 is being moved toward the first stage valve seat 3, the second stage pintel 2 will move along the second stage pintel guide 5 into the cavity 16, compressing the spring 7 in the process. The movement of the first stage pintel 1 toward the first stage valve seat 3 will result in a reduction of airflow through the first air passage 13, and then finally eliminated when the first stage pintel 1 comes into contact with the first stage valve seat 3. It is also noted that the controller may stop movement of the actuator at any point in the opening or closing of the first stage pintel 1 or the second stage pintel 3 when the airflow requirements of the device using the air have been met.

Figure 4:
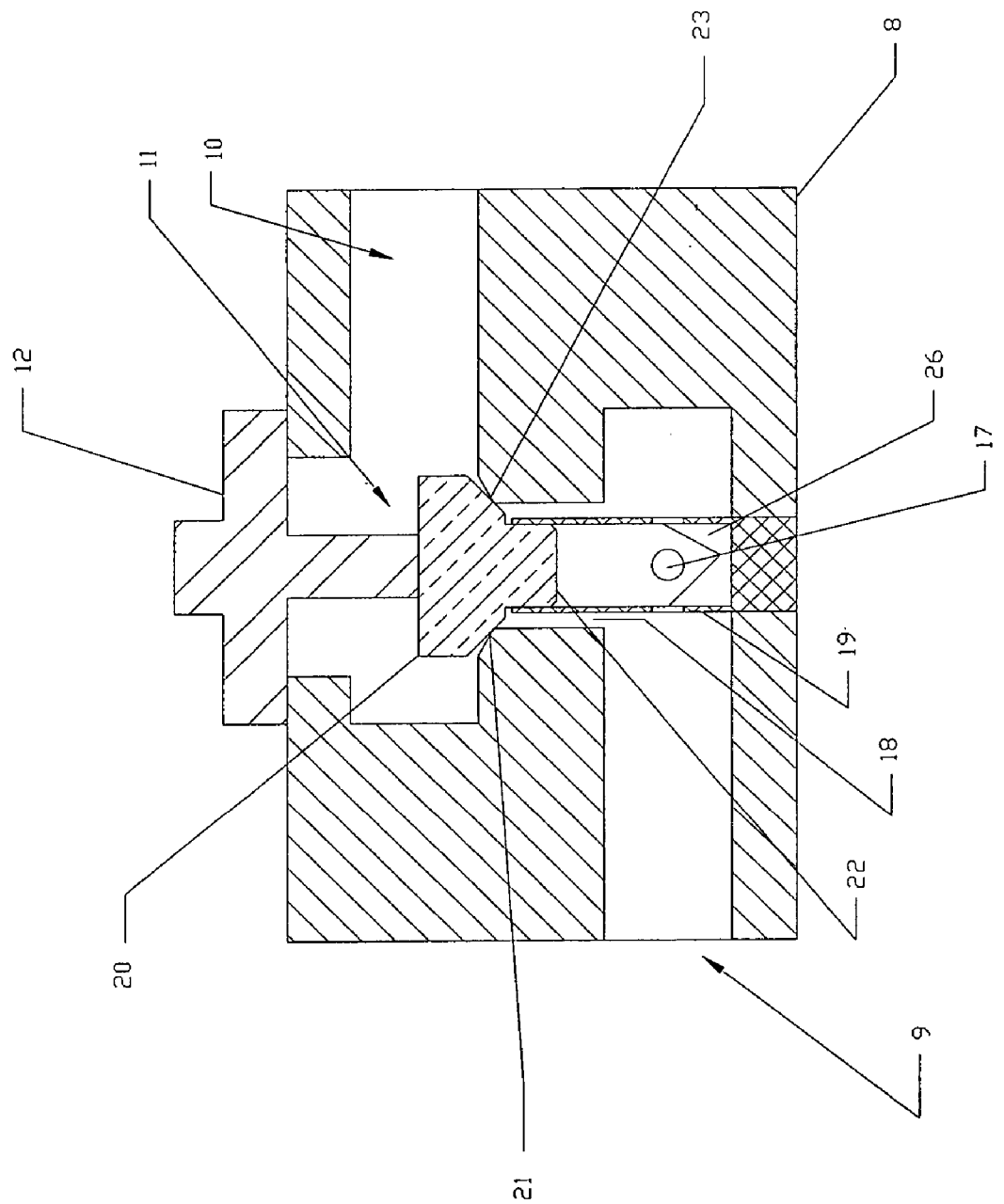
FIG. 4 is a cut away side view of a second embodiment of a valve in a closed position.
Figure 5:
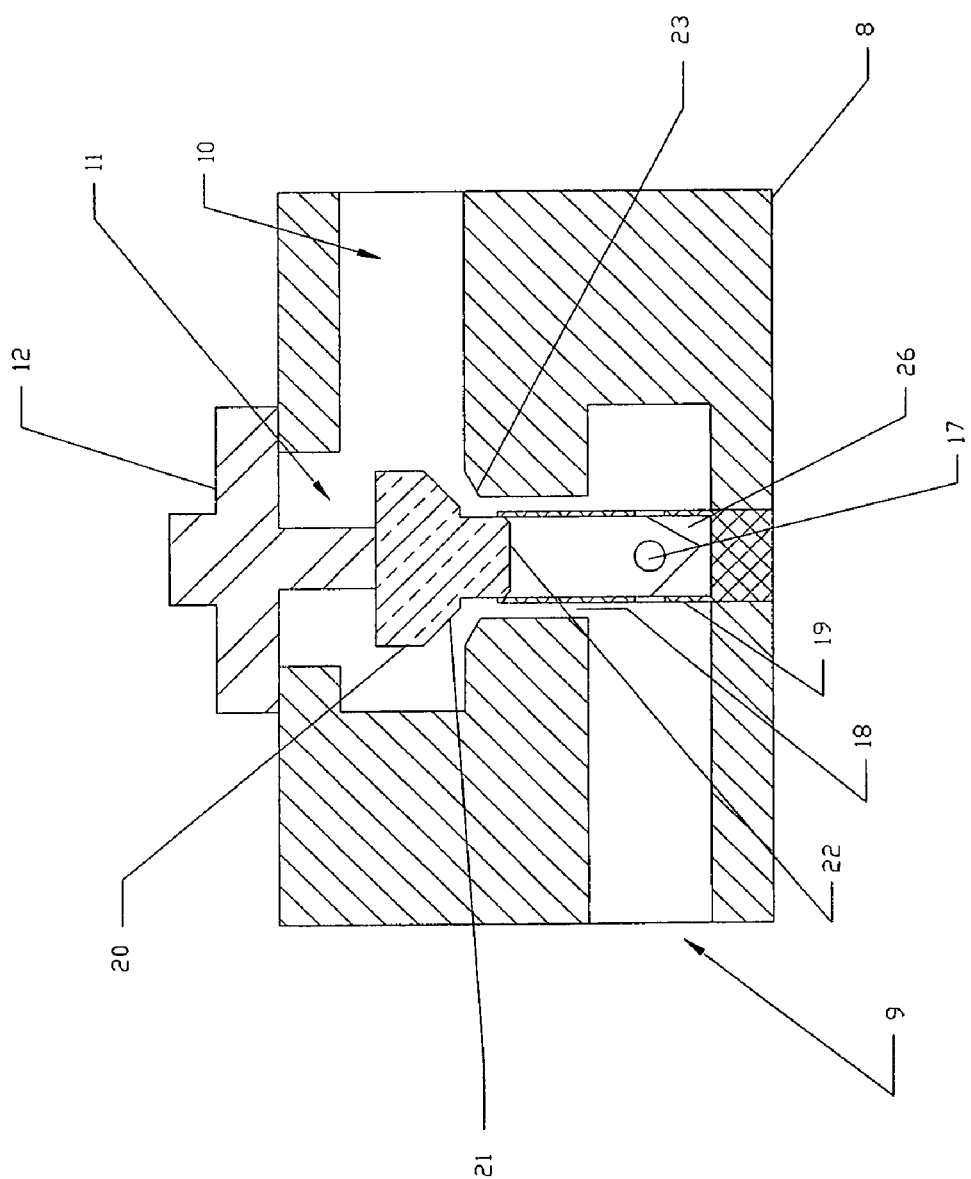
FIG. 5 is a cut away side view of a second embodiment of a valve having a first pintel stage open and a second pintel stage closed.
Figure 6:
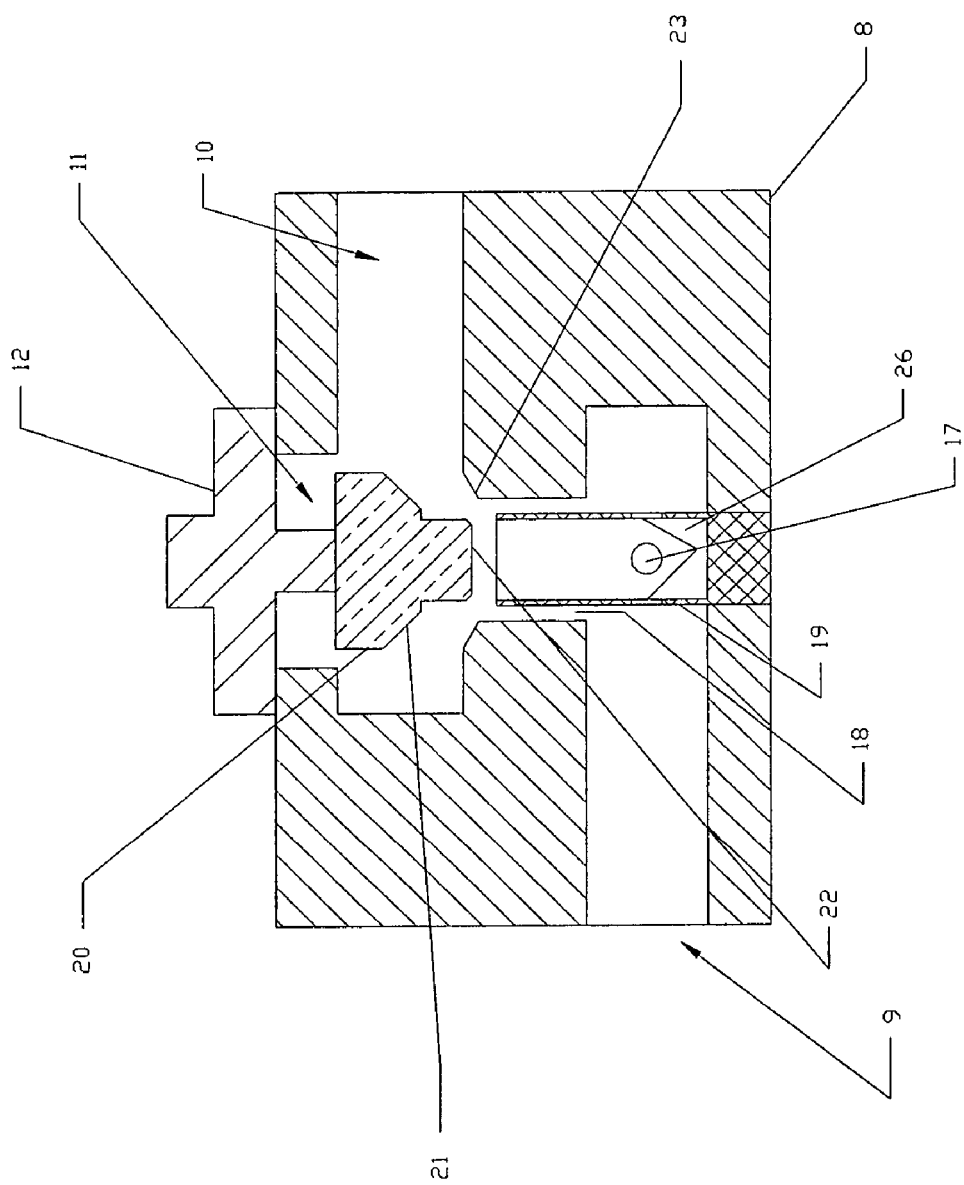
FIG. 6 is a cut away side view of a second embodiment of a valve having the first and second pintel stages open.

The shape of the valve seats and the pintels may be different than shown in the figures depending upon the application and the depicted shape should not be considered to be limiting in any way. Additionally the use of the term "pintel" includes many shapes conceptually, and does not exclude the use of various and differently shaped members than those depicted in this embodiment, the use of which would be mere matters of design choice and are within the scope of this invention and within the scope of the term "pintel" per se. Furthermore, the pintels may be made of various materials which may include, but is not limited to many species of metal or plastic. The material is chosen based on several factors such as the conditions the valve will be exposed to and durability requirements the valve will be expected to meet Referring now to FIGS. 4-6, a second embodiment is shown. Parts which correspond to the first embodiment are numbered as in the first embodiment. However, in this embodiment, the mount may comprise a longer mount which extends into air inlet passage 9. In this embodiment, the mount takes the form of a tube 19 with a circular cross-section. However, the shape of the mount in this invention and/or this embodiment is not limited to a tube or to a tubular shape. The tube 19 may be pressed, threaded or otherwise attached to or formed in the housing 8. Additionally, the tube 19 contains airflow holes 17 which allow air to flow to the second air passage 26 located within the tube 19. There is a sufficient quantity of airflow holes 17 of sufficient size to accommodate the flow of air that is needed to flow through the second stage air passage 26 As shown in FIG. 4, the second pintel stage 22 is formed to be a section of the pintel 20 and is dimensioned to be of smaller diameter than the first pintel stage 21. Accordingly, the second pintel stage 22 is structured to be inserted into the tube 19 when moved by the actuator 12. Overall, the insertion of the second pintel stage 22 substantially prevents airflow through the second stage air passage 26. However, any residual airflow may be compensated for by calibration. Additionally, an optional seal may be added as discussed further below. Thus, a two stage airflow valve is created as shown by comparing the operational positions shown in FIGS. 4, 5, and 6. For example, in FIG. 4, no air is permitted to flow because the pintel 20 is fully engaged so that the second pintel stage 22 is located within tube 19. Additionally, the first pintel stage 21 is in contact with the first stage valve seat 23. In FIG. 5, air is permitted to flow through the first stage air passage 18, but no air is permitted to flow out of the tube 19. In FIG. 6, air is permitted to flow through both the first stage air passage 18 and the second stage air passage 26.

As shown by comparing FIGS. 4-6 the valve operates in three main open or closed states which are also adjustable. Specifically, as a controller or airflow meter (not shown) determines that airflow is needed in order to satisfy the demands of the device using the air, the controller sends a signal to the actuator 12. In response, the actuator 12 retracts the first pintel stage 21 from the first stage valve seat 23. As the first pintel stage 21 is retracted from the first stage valve seat 23, the second pintel stage 22 slides within the tube 19. With the second pintel stage 22 still inserted in tube 19, air is allowed to only flow through the first stage air passage 18 at this point. If the controller determines that additional airflow is required in order to satisfy the demands of the device using the air, the controller will continue to signal the actuator 12 to retract the first pintel stage 21 further from the first stage valve seat 23. As the first pintel stage 21 is retracted further from the first stage valve seat 23, more air is allowed to flow through the first stage air passage 18 due to the change in geometry between the first pintel stage 21 and the first stage valve seat 23. When the controller determines that the airflow requirements of the device using the air cannot be satisfied only by retracting the first pintel stage 21 from the first stage valve seat 23, the controller will signal the actuator 12 to retract the first pintel stage 21 until the second pintel stage 22 is removed from the tube 19. As the actuator 12 continues to retract, the second pintel stage 22 will be lifted further from the tube 19 and additional air will flow through the second stage air passage 26 due to the change in geometry between the pintel second stage 22 and the tube 19.

When the controller determines that the airflow requirements of the device using the air has been reduced, the process is reversed. First, the controller will signal the actuator 12 to move the second pintel stage 22 toward the tube 19. While the second pintel stage 22 moves toward the tube 19, the flow of air through the second stage air passage 26 will be reduced, and then finally eliminated when the second pintel stage 22 is inserted into the tube 19. If the controller determines that further reduction of the airflow is need in order to match the requirements of the device using the air, the actuator 12 will be signaled to move the first pintel stage 21 toward the first stage valve seat 23. While the first pintel stage 21 is being moved toward the first stage valve seat 23, the second pintel stage 22 will slide within the tube 19. The movement of the first pintel stage 21 toward the first stage valve seat 23 will result in a reduction of airflow through the first air passage 18, and then finally eliminated when the first pintel stage 21 comes into contact with the first stage valve seat 23. It is also noted that the controller may stop movement of the actuator at any point in the opening or closing of the first pintel stage 21 or the second pintel stage 22 when the airflow requirements of the device using the air have been met.

An optional seal (not shown) may also be included. One benefit of this seal is to more fully restrict the flow of air through the second stage air passage 26. A second benefit would be to help increase the allowable tolerances when manufacturing the pintel second stage 22 and the tube 19. The seal could be located on the outer circumference of the pintel second stage 22 or on the inner circumference of the tube 19. Preferably, the seal would be located near the distal end of the second pintel stage 22 or near the air outlet end of the tube 19. This location would allow more complete restriction of the flow of air through the second stage air passage 26 for the entire time the second pintel stage 22 is inserted into the tube 19. The seal could be made of various materials including, but not limited to, rubber, plastic, or PTFE.

One benefit of the second embodiment as compared to the first embodiment, is the requirement for fewer and less complex parts because the pintel 20 provides in one structurally integral unit, both the first pintel stage 21 and the second pintel stage 22 thus eliminating the need for a spring 7, a second stage pintel guide 5, a second stage pintel stop 6, and a separate second stage pintel 2. Fewer and less complex parts will reduce assembly time, and component costs.

Thus, in summary, this invention may provide a valve that does not require the use of two actuators or two stepper motors. This invention may also provide an air control valve which uses a two stage pintel and concentric valve seats with one valve seat arranged within the other to allow for increased resolution.

Additionally, there are numerous ways to configure the valves described above. For example, depending on the system requirements, the diameter and shape and angles of each stage of the pintel or valve seats could be tailored to achieve the desired flow characteristics. In the examples described above, the flow area of the first stage is approximatly equal to the flow area of the second stage.

While the preferred embodiment to the invention has been described, it will be understood that those skilled in the art, both now and in the future, may make various improvements and enhancements which fall within the scope of the claims which follow.

The invention claimed is:

1. A flow valve for gases or liquids comprising:
   a first stage valve seat located on a flow aperture;
   a mount located radially inward from the first valve seat within the aperture, wherein the mount defines a single contiguous first passage connected in parallel with and concentric to a single contiguous second passage;
   a first stage pintel sized to interface with the first stage valve seat, wherein the first stage pintel is structured to adjustably increase, decrease or stop the flow of gasses or liquids through the first passage, the first stage pintel further structured to be selectively positioned at a location intermediate of its fully opened and fully closed positions;
   a second stage pintel located concentrically with the first stage pintel wherein the second stage pintel has a smaller diameter than the first stage pintel and is structured to adjustably increase, decrease or stop the flow of gasses or liquids through the second passage, the second stage pintel further structured to be selectively positioned at a location intermediate of its fully opened and fully closed positions; and control means for adjustably controlling the first and second stage pintels to adjustably increase or decrease the flow of gases or liquids through each of the first and second passages to provide a desired flow of gasses or liquids through the flow valve.

2. The flow valve of claim 1 further comprising:
a single motor for actuating an actuator to control movement of at least one of the stages.

3. The flow valve of claim 1 wherein a one piece housing encloses the valve.

4. The flow valve of claim 1 wherein the second stage pintel is located within a cavity formed in the first stage pintel.

5. The flow valve of claim 1 wherein the second stage pintel is moveable and resiliently biased away from the first stage pintel by a spring.

6. The flow valve of claim 1 wherein the second stage pintel is formed of a smaller diameter section of the first stage pintel.

7. The flow valve of claim 1 wherein the second stage pintel contacts a second stage valve seat to stop flow through the second passage formed in the mount.

8. The flow valve of claim 1 wherein the second stage pintel slides within the mount to stop flow through the second passage.

9. The second stage pintel of claim 8 wherein a seal is provided on the outside diameter of said second pintel stage.

10. The flow valve of claim 1 wherein a second stage valve seat is located on the mount within the aperture.

11. The flow valve of claim 1 wherein the second stage valve seat is mounted within the aperture.

12. A high resolution flow valve for gases or liquids comprising:
a housing;
a single inlet;
a first stage valve connected to the inlet for controlling a first flow through a single contiguous first passage, wherein the first stage valve is structured to adjustably increase, decrease or stop the flow of gasses or liquids, the first stage valve further structured to be selectively positioned at a location intermediate of its fully opened and fully closed positions;
a second stage valve located concentrically within the first stage valve and also connected to the inlet for controlling an additional second flow through a single contiguous second passage fixed with respect to the housing and concentrically surrounded by the first passage, wherein the second stage valve is structured to adjustably increase, decrease or stop the flow of gasses or liquids, the second stage valve further structured to be selectively positioned at a location intermediate of its fully opened and fully closed positions;
a single outlet connected to the first and second stage valve; and
control means for adjustably controlling the first and second stage valves to adjustably increase or decrease the flow of gases or liquids through each of the first and second passages to provide a desired flow of gasses or liquids through the flow valve.

13. A method for controlling flow of gases or liquids through a valve with high resolution comprising:
sending flow through a single inlet located in a housing;
sending the flow next through a first chamber located within the housing;
sending the flow to an aperture located in the housing that connects the first chamber to a second chamber;
adjusting the flow at the aperture in two stages via an actuatable valve member structured to adjustably increase, decrease, or prevent flow through the aperture by actuating a two stage pintel arrangement wherein a first pintel is initially adjusted for providing a desired flow through a single contiguous first passage as a first stage and wherein a second pintel located concentrically with the first pintel and having a smaller diameter than the first pintel is subsequently adjusted for providing a desired flow through a single contiguous second passage as a second stage, wherein the first passage is connected in parallel with and concentrically surrounds the second passage; and
sending the flow next through a single outlet located in the housing and connected to the second chamber.

14. The method of claim 13 further comprising:
locating the second pintel within a cavity of the first pintel wherein said second pintel is moveable and resiliently biased away from the first pintel by a spring.

15. The method of claim 13 further comprising:
forming the second pintel to be structurally integral with the first pintel and forming the second pintel to be moveable within said second passage to regulate flow through the second passage.

* * * * *